(No Model.)

B. T. BABBITT.
STEAM GENERATOR.

No. 348,093. Patented Aug. 24, 1886.

Witnesses:
C. Sundgren
Emil Herter

Inventor:
Benjamin T. Babbitt
by his attys
Brown & Hall

United States Patent Office.

BENJAMIN T. BABBITT, OF NEW YORK, N. Y.

STEAM-GENERATOR.

SPECIFICATION forming part of Letters Patent No. 348,093, dated August 24, 1886.

Application filed January 8, 1886. Serial No. 187,946. (No model.)

*To all whom it may concern:*

Be it known that I, BENJAMIN T. BABBITT, of the city and county of New York, in the State of New York, have invented a new and useful Improvement in Steam-Generators, of which the following is a specification.

My invention relates to steam-generators which comprise a central upright water-chamber and hollow arms, which project radially from said chamber around its circumference, and in which a circulation of water is produced by the heat from the fire below.

The object of my invention is to utilize the space which lies between the outwardly-projecting radial arms of the central water-chamber, and thereby to produce a generator which will have a much greater amount of heating-surface without increasing the external dimensions of the generator.

The invention consists in the combination, with a central upright water-chamber having a series of hollow arms projecting radially from it, of upright water-chambers arranged between said radial arms, near their outer ends, and also provided with hollow arms, which project radially inward toward the central water-chamber. By this construction the space between the hollow radial arms of the central water-chamber is occupied by the water-chambers which are arranged between them, and are provided with inwardly-projecting radial arms. The radial arms of the central water-chamber are preferably tapered in a direction away from said chamber, and the radial arms of the other water-chambers are tapered in a direction toward the central water-chamber.

Figure 1:
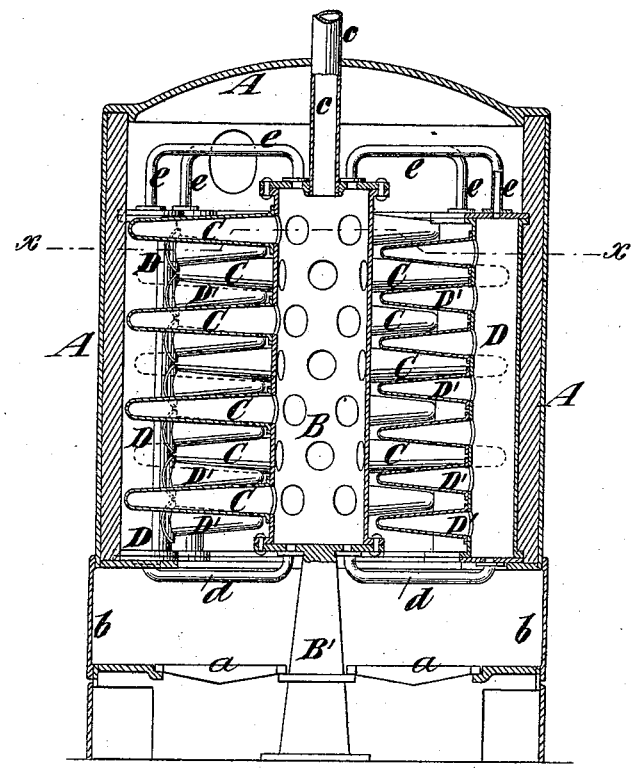
Figure 2:
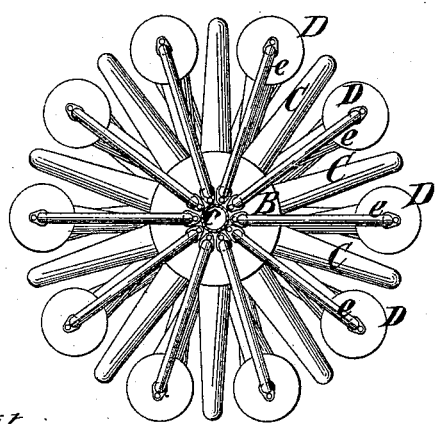
Figure 3:
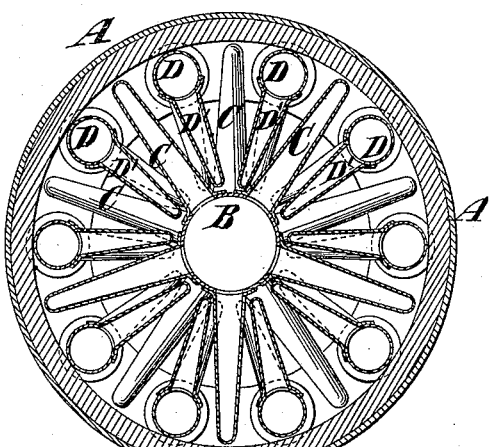

In the accompanying drawings, Figure 1 is a vertical section of a steam-generator embodying my invention. Fig. 2 is a plan of the portions thereof which contain water or steam; and Fig. 3 is a horizontal section upon the plane of the dotted line *x x*, Fig. 1.

Similar letters of reference designate corresponding parts in the several figures.

A designates the outer casing of the generator, in the lower part of which is a grate or grates, *a*, which may be supplied with fuel through suitable doors, *b*.

B designates a central upright water-chamber, which is supported upon a post or pedestal, B'. This central upright water-chamber is provided with hollow arms C, which project from it radially outward, and which are here shown as tapered in a direction away from the central chamber, B. At the upper end of the central water-chamber, B, is a pipe, *c*, through which steam may be supplied from the generator.

The generator also comprises a circular series of supplemental upright water-chambers, D, which are here shown as of cylindric form, and are arranged between the radial arms C of the central water-chamber, B, at a point near the outer ends of said arms, as best shown in Figs. 2 and 3. The generator may comprise any number of these supplemental water-chambers D, according to the distance at which the radial arms C are arranged apart in a horizontal direction. The supplemental water-chambers D are at their lower ends each connected by a pipe, *d*, with the central water-chamber, B, and at their upper ends are connected by pipes *e* with the central water-chamber, so as to provide an outlet for the steam which may be generated from the water in them. The supplemental water-chambers D are also provided with hollow arms D', which project inward radially toward the central water-chamber, B, and these arms also are tapered in a direction away from the water-chambers D, with which they communicate, and toward the central water-chamber, B. The tapering form of the radial arms C D' promotes the circulation of water in them, and also economizes the space in the generator, inasmuch as the radial arms C are of largest diameter at the point where the radial arms D' are of smallest diameter, and vice versa.

I do not claim in my present invention a generator having an upright central water-chamber and hollow arms projecting radially therefrom; but it will be readily seen that by the employment, in a generator, of the supplemental upright water-chambers D, provided with radial arms D', I obtain a large increase in the heating-surface of the generator without at all increasing the outside dimensions thereof.

What I claim as my invention, and desire to secure by Letters Patent, is—

1. The combination, in a steam-generator, with a central upright reservoir or water-chamber having series of hollow arms projecting radially therefrom, of upright reservoirs or water-chambers arranged midway between the said radial hollow arms, near their outer ends, and each provided with hollow arms projecting radially therefrom inward toward the central reservoir or chamber, substantially as herein described.

2. The combination, with the central upright water-chamber, B, having hollow arms C projecting radially therefrom and tapering in a direction away from the central chamber, of upright water-chambers D, arranged between and near the ends of the radial arms C, and provided with hollow arms D', which project radially inward and taper in a direction toward the central chamber, B, substantially as herein described.

B. T. BABBITT.

Witnesses:
W. J. STODDARD,
JOHN H. TWADDLE.